Jan. 17, 1956  E. J. HOUDRY ET AL  2,731,541
CATALYTIC STRUCTURE AND APPARATUS
Filed July 9, 1954

INVENTOR.
EUGENE J. HOUDRY &
BY WILFRED M. ADEY

ATTORNEY

United States Patent Office 2,731,541
Patented Jan. 17, 1956

2,731,541

CATALYTIC STRUCTURE AND APPARATUS

Eugene J. Houdry, Ardmore, and Wilfred M. Adey, Paoli, Pa., assignors to Oxy-Catalyst, Inc., a corporation of Pennsylvania Application July 9, 1954, Serial No. 442,258

16 Claims. (Cl. 219—39)

This invention relates to catalytic structures and devices. More specifically, it is concerned with catalytic structures comprising electric resistance elements carrying a thin film of catalytically active material, and to devices embodying such elements.

The use of electrically heated resistance elements composed of, or provided with a coating of, catalytic material have been proposed in the past. The use of platinum wires, or of wires plated with metallic platinum, for this purpose is for example well known. Such platinum or platinized electrically heated wires have often been used as oxidation catalysts, particularly in instruments, such as those for detecting a presence of oxidizable vapors in a gas stream.

Catalytic structures of this type where the catalytic surface is heated directly by the passage of an electric current through a wire or the like composed of or coated with the catalytic material have a number of advantages over other types of catalysts. Using such structures, the catalytic surface may be brought to its activation temperature in a matter of seconds since heat supplied by the flow of the electric current through the wire is transmitted directly and immediately to its surface. This is a great advantage in many practical applications where it is desirable or necessary to bring the catalyst to its activation temperature in a short time. With most types of catalysts, a relatively large contact mass of relatively high heat capacity must be heated by heat exchange through the walls of the reaction chamber or with a stream of preheated reactants, with the result that a rather lengthy preheat period is required before reaction temperature is reached. A further advantage of such electrically heated catalytic structures is that the heating means and the catalyst itself form one unitary structure which makes possible a simpler and more compact arrangement as contrasted to the usual arrangement of a separate bed of catalyst and separate means for heating the reactants and/or the catalyst bed.

In accordance with this invention it has been found that catalytic structures of this general type combining the advantages of increased economy, high activity and resistance to poisoning may be provided by disposing on the surface of an electric resistance element a thin film of a catalytically active inorganic oxide of a type which is difficultly reducible, i. e. is not reduced in a hydrogen stream at temperatures of the order of 500° C., and which may be prepared in the form of a gelatinous hydrated oxide that may be dehydrated under controlled conditions to form dehydrated structures of large internal pore volume and surface area. Materials of this class which are particularly suitable include catalytically active alumina, beryllia, zirconia, magnesia and thoria. Such oxides or mixtures of oxides in catalytically active form may serve as complete catalysts in themselves or more usually may serve as a base or carrier for another catalytic material, such as a catalytically ctive metal, which may be deposited upon the film of oxide, or with which the film may be impregnated. Such inorganic oxides have good dielectric properties so that the film may serve both as a catalyst and to some extent as an electrical insulator.

The invention is particularly concerned with, and will be described chiefly with reference to the use of such catalytic structures as oxidation catalysts. As will be apparent from the detailed description which follows, the invention makes possible the provision of compact, inexpensive units, useful in a great many practical applications, particularly in cases where it is desired to oxidize traces of oxidizable fumes in a gas stream.

In preparing the oxide film it is essential, as stated, to employ a catalytically active form of the oxide of the type described and to preserve this catalytically active form in the finished catalyst. As is well known in the art of catalysis not all forms of these oxides are catalytically active, some forms possessing little or no catalytic properties. The catalytic form of these oxides is characterized by a minute, porous structure which possesses a large internal surface area. In the case of alumina for example, the so-called alpha alumina (corundum or Alundum), possesses little internal pore volume and is catalytically inert. The so-called gamma alumina on the other hand is characterized by a large internal surface area and is recognized as being the catalytic form. The catalytic forms of these oxides are often prepared synthetically by precipitation of a gel from a solution, followed by drying and then heating the gel at a controlled temperature to remove hydrated water. Catalytic alumina, for example, may be prepared synthetically by precipitating an alumina gel from a solution of an aluminum salt, drying the gel, and thereafter heating carefully at a temperature preferably below 1500° F. to expel the hydrated water and to produce substantially anhydrous or partially hydrated oxides which are the catalytically active, or so-called adsorptive forms of alumina. The other oxides may be prepared in catalytic form synthetically in a similar manner. As is well known, catalytic alumina may also be prepared from the naturally occurring bauxite, which contains hydrated alumina, by removal of impurities such as iron and silicates which it contains and heating at a temperature below 1500° F. to expel hydrated water.

This heating procedure at a controlled temperature to drive off the hydrated water is ordinarily termed activation. The fully hydrated form, while capable of being activated, does not itself possess catalytic properties and must be at least partially activated before catalytic properties appear.

During the preparation of the oxide film, and during use of the catalyst, care must be taken not to subject the oxide to excessive temperatures at which the catalytically active form, having high internal pore area, is transformed into an inert form characterized by small internal surface area. This transformation occurs generally at temperatures in excess of about 1800° F. to 2100° F., although, depending on the particular oxide and its purity, the transformation temperature may be sometimes somewhat lower. This limitation makes it impossible to prepare the films by sintering or melting the oxide on the surface of the wire or the like to secure adherence since this will completely destroy all catalytic activity. While operating temperatures during use may range close to this transformation point, preferably for long life and sustained catalyst activity, operating temperatures should be maintained below about 1500° F. and preferably below 1200° F.

Using such a film composed chiefly of these catalytically active oxides, care should be taken to employ an electric resistance element composed of a material which will not detrimentally effect the catalytic activity of the oxide. In some cases, for example, iron containing or copper containing alloys have a tendency to poison the film of catalytic oxide destroying its catalytic activity. Determination of the suitability of the material to receive the catalytic film can be easily determined by preparing a sample and checking its activity under operating conditions. For long catalyst life, a resistance element composed of a nickel-chromium alloy and containing little or no iron is particularly suitable.

For producing a coating on smooth metal surfaces certain combinations of oxides have been found to give films of superior quality with respect to hardness and uniformity of adherence. In particular mixtures of catalytic alumina with catalytic beryllia or of catalytic alumina with catalytic zirconia have been found to provide superior catalytic films on such surfaces, without the necessity of any special pre-treatment of the surface. In some cases it may be found desirable, in order to improve the adherence of the film, or to insulate the catalytic material from the metal surface to prevent poisoning of the catalyst, to provide an intermediate bonding film, such as a thin, adherent porcelain coating, between the surface of the wire or the like and the catalytic film. The intermediate film should be quite thin, preferably less than .003" in thickness so as not to interfere unduly with the immediate conductance of heat from the resistance element to the catalytic film.

The thickness of the catalytic film is of great importance. Essentially, the film of catalytic oxide should be very thin, as low as .0001" and not in excess of about .006". Films of greater thickness than this have a strong tendency to crack and flake because of the wide differences in the coefficients of expansion of the metal and of the oxide. The most satisfactory results using a metal resistance element are generally obtained with catalytic oxide films having a thickness of from about .0003" to .0015".

The film of catalytically active oxide provides an excellent base or carrier for finely divided catalytically active metals to produce catalytic structures of outstanding properties. Despite the extreme thinness of the catalytic film, catalysts of excellen activity may be provided. In particular, oxidation catalysts of superior flexibility, activity and durability may be produced by impregnating a film of catalytic oxide composed chiefly of alumina, beryllia, thoria, magnesia, zirconia or mixtures thereof, with finely divided metal such as platinum, ruthenium, palladium, silver, copper, chromium, cobalt and nickel, or combinations of these metals. Particularly excellent results are obtained with the use of platinum. Impregnation may be accomplished by methods well known in the art such as by impregnating the dry film of catalytically active oxide with an aqueous solution of a salt of the desired metal and then decomposing the salt into the catalytically active metal, which is thereby deposited upon and within the active oxide film in a finely divided condition. The film may be impregnated with platinum for example by immersing the support carrying the film in a solution of chloroplatinic acid ($H_2PtCl_6.6H_2O$), drying, and then heating to decompose the platinum salt, thus depositing metallic platinum in finely divided form on and within the oxide film.

The amount of metal impregnating the film of catalytically active oxide should be minor relative to the weight of the oxide film, and generally should not exceed 30% of the weight of the film. Preferably, however, the weight of metal in the film should be considerably less than 30% and should be in the range of from about 0.2% to 5%. Such low concentrations of metal ordinarily have little effect on the dielectric characteristics of the oxide film.

The catalytic inorganic oxides referred to above may be applied to the surface of the electric resistance element by contacting it, preferably by dipping, with a slurry of the oxide or mixture of oxides, in finely divided form in a liquid vehicle. Preferably, the film is deposited by the method described in U. S. Patent 2,580,806 of Louis E. Malina. According to this method a slurry is prepared consisting of a mixture of the finely divided oxides suspended in an aqueous solution of a compound decomposable into a catalytic inorganic oxide, such as, for example, a slurry consisting of finely divided alumina suspended in an aqueous solution of aluminum nitrate.

From such a slurry, the film is deposited upon the support preferably by dipping into the slurry, draining, drying to evaporate free moisture, and then heating at a temperature below about 1500° F. to decompose the compound originally present in solution into its catalytic oxide. For example, by dipping the electric resistance element into a slurry consisting of a finely divided catalytic alumina suspended in a saturated aqueous solution of aluminum nitrate, a uniform deposit is produced on the surface of the element. After drying, this deposit consists of a film of catalytic alumina, containing aluminum nitrate crystals deposited during evaporation of the free moisture. Upon heating this film to about 500° F. the aluminum nitrate decomposes "in situ" into catalytic alumina.

In order to insure the production of a film of maximum hardness and of excellent adherence to the surface of the electric resistance element, preferably the catalytically active oxide is reduced to an extremely finely divided condition before being deposited on the surface of the element. This may be accomplished by subjecting the oxide to a severe colloidization operation preferably in an attrition type colloid mill, using a wet grinding technique with the oxide suspended in an aqueous vehicle. A detailed description of this type of colloidizing operais given in copending application Serial No. 340,230, filed March 4, 1953, by Eugene J. Houdry, for Catalyst Manufacture.

Using the techniques described above for depositing a film of catalytic oxide ordinarily a film having a thickness of from about .0001" to about .001" can be deposited on a metal electric resistance element in one dipping operation depending on the way the dipping is carried out, the composition of the slurry etc. In a continuous operation, where a running length of wire is drawn through a slurry bath, the thickness of the finished coating may range for example between .0002" and .0004".

Reference is now made to the accompanying drawings which illustrate a preferred embodiment of a catalytic structure provided by the invention and of a catalytic device in which such a structure may be incorporated.

Figure 1:
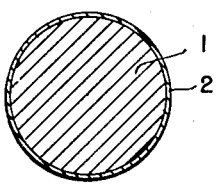
Fig. 1 is an enlarged cross sectional view of a resistance wire showing the thin catalytic coating.

In Fig. 1, the reference numeral 1 indicates a metal electric resistance wire which is provided with a thin, adherent, superficial film of catalytically active material 2. This film should be not more than about .006" and may be as little as about .0001" in thickness.

Figure 2:
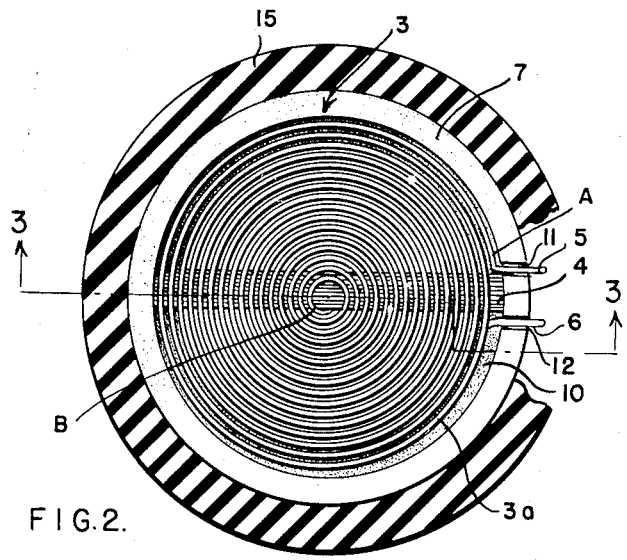
Fig. 2 is a top plan view of a flat coil of resistance wire provided with a catalytic coating shown mounted in a cylindrical coil holder.

In Fig. 2 an electric resistance wire provided with a thin film of catalyst as illustrated in Fig. 1, is shown wound in the form of a flat, spiral coil, indicated generally by the reference numeral 3. The coil illustrated is actually a double coil wound from a single length of resistance wire, the two coils being superimposed and separated from one another by a thin strip 4, composed of a non-conducting material such as mica. The superimposed relationship of the two coils may be seen in Fig. 3. The top coil 3a shown in plan in Fig. 2 begins at point A at the outside of the spiral, and terminates at point B at the inside of the spiral, at which point it connects with the lower coil 3b which begins at point C at the inside of the spiral and terminates at point D at the outside of the spiral. The top coil is connected to lead 5, while the lower coil is connected to lead 6. These leads are preferably continuations of the wire forming the coils themselves.

A double coil of the design shown, in which the adjacent turns of the coils are in close proximity to one another is very desirable from the standpoint of efficient contact between the surface of the catalyst coated wire and fluid reactants flowing over it. Using such an arrangement, a relatively large amount of catalyst surface area may be disposed in a relatively small volume, while at the same time the pressure drop in a gas stream flowing across such as coil is quite small. As may be seen, the turns of the coil are quite closely spaced and consequently may tend to come in contact with one another if the coil becomes slightly distorted. Since the coating of the catalytic material is dielectric in nature it helps to insulate the turns of the coil from one another and thus helps to prevent short-circuiting should adjacent parts of the coil contact one another.

Figure 3:
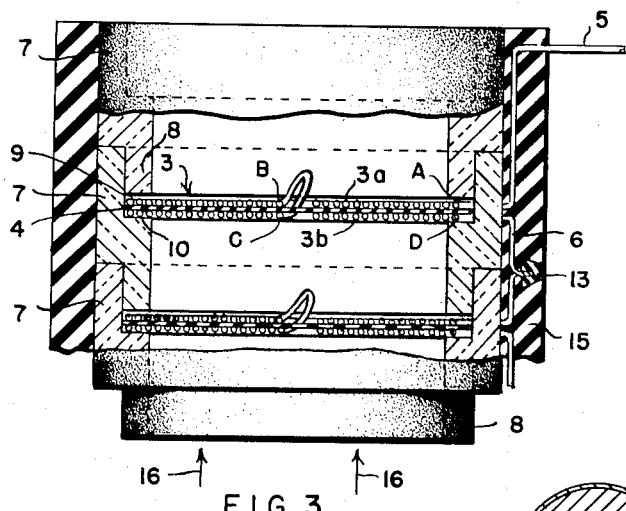
Fig. 3 is a side elevation, partly in section, of an assembly of several coils and coil holders of the type shown in Fig. 2, the parts in section being taken on the line 3—3 of Fig. 2.

The double coil 3 is supported in a cylindrical coil holder 7 which is preferably composed of a heat resistant dielectric material such as of ceramic. As may be seen in Figures 2 and 3, each coil holder 7 is annular in shape and is adapted to telescope partially into another coil holder. For this purpose, the wall thickness of each coil holder is reduced internally at one end and externally at the other. The reduced external portion provides a male portion 8 which fits into the internally reduced or female end of the next coil holder. The length of the male portion 8 is adjusted so that an annular space 9 is left between the end of the male portion 8 and the internal shoulder 10 formed by the internal reduction of the wall thickness. The coil 3 is supported in this annular space on the shoulder 10 and held in place by the male portion 8 of the next coil holder. In Fig. 2, the coil holder normally holding the coil in place is shown removed, the coil thus merely resting upon the shoulder 10. As shown in Fig. 3, the top coil holder is shown as not being equipped with a coil, although it may be of course, in which case suitable means, such as a washer, should be provided to hold the top coil in place upon the shoulder 10.

Figure 4:
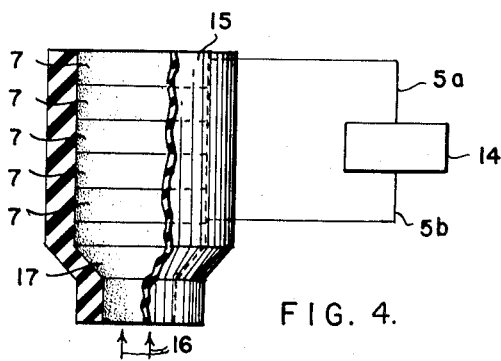
Fig. 4 is a catalytic device made up of units such as those illustrated in Figures 2 and 3, and shown connected to a source of electric power.

In assembling the unit, the coil 3, with its separating strip 4, is dropped into the coil holder from the female end, the leads 5 and 6 being accommodated by slots 11 and 12 respectively, which extend through the wall of the coil holder from the female end down to the internal shoulder 10. After the coils are placed in the holders in this manner, any desired number of the coil and holder assemblies may be telescoped in the manner shown. The coils may be then connected in series as shown in Fig. 3. Any desired method for connecting the coil leads together may be employed such as by twisting and thereafter inserting the twisted wires into a standard ceramic insulator such as the insulator 13 illustrated. The free lead wires from the bottom and top coils may then be connected to a source of electric current as illustrated in Fig. 4. As illustrated in this figure, the free lead wire 5a from the top coil, and the free lead wire 5b from the bottom coil are connected to a source of electric current indicated at 14. Besides connecting the coils electrically, the connections between the successive coils in the assembly also serve to fasten the coil holders together as a single unit.

To prevent excessive heat losses, the entire assembly is preferably provided with an external layer of insulating material 15 which may be Fiberglas, glass wool, asbestos or any other suitable insulator. The leads from the coils and the connectors 13 may be accommodated by this insulation as illustrated.

In use, a stream of reactants is introduced into one end of the assembly as indicated for example by the arrows 16, and flows successively over each coil in contact with the catalytic surface disposed thereon. The required reaction temperature is maintained at the surface of the catalyst by passing the proper amount of current through the coils to maintain surface temperature. If the reactants are appreciably below the required reaction temperature, heat exchange will of course occur between the reactants and the heated coils, tending to heat the reactants and to cool the surface of the coil. To prevent undue cooling of the first coils in the series, and to maintain a more uniform temperature in the assembly, it may be desirable in cases where the entering reactants are cool, to provide for a greater energy output at the coils first in the series than in the coils at the end of the series. This may be accomplished for example in a system such as that illustrated where the successive coils are series-connected by constructing the coils which are first contacted of finer gage wire or of material having a higher specific resistance than coils later in the series such that the energy output in the first series of coils will be greater and thereby compensate for the heat losses to the initially cool reactants.

If desired, the stream entering the unit may be preheated by the hotter gases leaving the unit by indirect heat exchange. With the use of an efficient heat exchanger energy losses because of sensible heat in the stream leaving the unit may be held to a minimum.

In this type of unit illustrated, the amount of catalytic surface may be varied at will by varying the number of coils in the assembly. In Fig. 4 an assembly of five coil holders is shown. The last coil holder in the assembly is shown as connected to an adapter 17 which in turn may be connected to the source supplying the reactants.

It will of course be apparent that many variations are possible both in the construction of the resistance element itself and in the type of support for the element. Other shapes rather than a wire coil for example may be employed for the resistance element which provide efficient and thorough contact between the catalyst coated surface of the resistance element and the stream of reactants such as closely-spaced electrically-connected parallel sections of metal resistance tape or wire arrranged across the path of flow of the reactants stream. Likewise, although a metallic resistance element will be preferred for many applications, a non-metallic resistance element, such as a carbon resistor may be used.

*Example I*

A coil of resistance wire of the design shown in the drawings was employed. The coil was wound from 10 feet of a 22-gage resistance wire (80% nickel-20% chromium). Adjacent turns of the coil were spaced approximately .025" apart. Such a coil was provided in the following manner with a catalytic film consisting of a mixture of alumina and beryllia.

A calcined, catalytic grade alumina powder ground through about 300 mesh, manufactured by the Harshaw Company, was employed, this alumina having the following analysis:

|  | Percent by weight |
|---|---|
| $Al_2O_3$ | 90.2 |
| $Na_2O$ | 0.43 |
| $Fe_2O_3$ | Less than 0.36 |
| $SiO_2$ | Less than 0.18 |
| Combined $H_2O$ | 9.1 |

This alumina was mixed with water in the proportion of 5 kilograms of alumina powder in sufficient water to give 8 litres of slurry. This water-alumina mixture was passed repeatedly through an attrition type colloid mill, being careful to maintain uniformity of the slurry by agitation. The colloid mill employed is manufactured by the Troy Engine & Machine Company, of Troy, Pennsylvania. It consists of a rotating disc and a stationary disc between which the slurry is pumped, with adjustable means for forcing these discs toward one another. The rotating disc revolves at a speed of 20,000 R. P. M. while the slurry is forced between it and the stator thereby subjecting the particles to hydraulic shear.

The original mixture was passed through this mill a total of eight times. With each successive pass through the mill, the adjustment for increasing the force with which the discs are biased toward one another was increased until colloidization was completed to the desired extent. The end point of the colloidization procedure was determined by the fact that the alumina-water slurry (containing approximately equal weights of water and alumina) underwent a rather remarkable increase in viscosity, acquiring a smooth semi-self-sustaining consistency and showing very little tendency to separate into two phases even on prolonged standing. Particle size studies on this slurry by sedimentation technique and electron microscope examination shows that approximately 50% of the mass has been reduced to a particle size below one micron while there is less than a negligible weight percentage of particles of greater than 20 microns in size. The specific surface of the alumina particles calculated from particle size distribution curves is of the order of 80,000 square centimeters per cubic centimeter of packed volume assuming spherical particles and considering only the outside geometric area of each particle (that is, neglecting internal pore area).

A catalytic grade beryllia, calcined at a temperature of 1000° C. to 1100° C. manufactured by the Brush Beryllium Company and having the following analysis was employed:

| | Percent |
|---|---|
| BeO | 99.3 |
| Fe | 0.05 |
| Si | 0.12 |
| Ca | 0.10 |

This beryllia was mixed with water and subjected to approximately the same type of colloidization operation as described above with reference to the alumina.

At the end of the colloidization operation, the water-alumina slurry contained about 44% solids by weight and the beryllia-water slurry contained about 56% solids by weight. These two slurries were mixed together and with aluminum nitrate crystals in the following proportions, which in the finished film produces substantially equimolecular proportions of alumina and beryllia:

43.5 BeO-water slurry (56% solids).
228.0 gms. $Al_2O_3$-water slurry (44% solids).
16.0 gms. $Al(NO_3)_3.9H_2O$ crystals.

The coil of resistance wire was dipped into this mixture, removed, drained, and the excess slurry removed by vigorous shaking. The coil was connected to a source of electric current and heated electrically to incipient red heat (about 1000° F.) over a period of 1 to 2 minutes by gradually increasing the flow of current through the coil. This produced evaporation of free moisture leaving a film consisting of a mixture of catalytic alumina and beryllia on the wire having a thickness of about .0005". To increase the thickness of the film, the coil was again dipped into the mixture described above, removed, drained, shaken vigorously, and then heated electrically to dry the film.

The film thus produced, about .001" in thickness, was firmly adherent to the surface of the wire and was quite hard and resistant to chalking. To test its ability to withstand repeated expansions and contractions of the wire, the coil containing the catalytic coating was heated to red heat (about 1200°–1400° F.) and then cooled 10,000 times with no detectable deterioration in the catalytic coating. Although the coated wire could not be sharply bent without dislodging the alumina-beryllia film, it could be flexed considerably without damaging the film.

An oxidation catalyst of excellent activity was prepared by dipping this coil, containing the alumina-beryllia film into an aqueous solution of chloroplatinic acid ($H_2PtCl_6.6H_2O$), containing 1% platinum by weight. The coil was again heated slowly by passing electric current through the wire, bringing the coil to red heat. Complete decomposition of the platinum salt into metallic platinum was accomplished by heating the coil in a gas flame to bright redness.

The resultant catalytic structure, in which the film of catalytic alumina and beryllia contained about 1% by weight of metallic platinum, was connected to a source of electric current and the voltage was changed to vary current between 1 and 3 amperes. Under these conditions the temperature at the surface of the coil varied between about 500° F. and 1200° F. At the higher temperature, the coil glowed at bright redness. Under these conditions, there was no appreciable short-circuiting, although some adjacent turns of the coil were in contact. The concentration of platinum in the film of oxide was insufficient under these operating conditions to appreciably affect the dielectric properties of the alumina-beryllia film.

Coils coated with such a catalytic film were mounted in coil holders such as those illustrated in the drawings, five of such coils being connected in series. In such an assembly, the coils being constructed of 22 gage wire, a total of 50 feet of wire was employed, giving a total catalytic surface area of 51 square inches.

This unit was employed for oxidizing trace organic constituents in a gas stream in the following manner. A current of 1.5 amperes at 75 volts was passed through the coils, the power consumption being 113 watts. Under these conditions, the unit was connected to the vent from an oven employed for the baking and roasting of meats and other foods. The effluent from the oven passed through the unit and over the catalyst coated coils. Grease, smoke, and all odorous constituents produced during the cooking operations were eliminated substantially completely by catalytic oxidation at the surface of the coils. Temperature at the surface of the coils during these operations was of the order of 700 to 800° F., well below the point of incipient incandescence.

Under the same conditions, the same unit proved equally effective in eliminating dense tobacco smoke in an air stream, and in the elimination by catalystic oxidation of low concentrations of various organic materials such as methane, carbon monoxide, acetic acid, and formaldehyde carried by an air stream flowing into the unit at atmospheric temperatures.

Similar results were obtained with a coil provided with a film of alumina-beryllia impregnated with a small amount of palladium. Electric resistance wire coated with the following catalyitc films having a thickness of from .0003" to .0015" also proved to be active oxidation catalysts; a film of a mixture of alumina and zirconia impregnated with about 1% to 2% of platinum, a film of a mixture of alumina, zirconia and thoria impregnated with about 1% to 2% of platinum. The following catalytic films having a thickness of .0005" to .0015" and of good activity in promoting oxidation reactions were also prepared on a resistance wire: alumina impregnated with 1% to 2% platinum; beryllia impregnated with 1% to 2% platinum; a mixture of thoria and alumina impregnated with 1% to 2% platinum; a mixture of alumina and magnesia impregnated with 1% to 2% of platinum. These latter films, although active, did not have the excellent physical characteristics of films prepared from mixtures of alumina with beryllia or zirconia, but are sufficiently adherent to the surface of the wire to be useful for some purposes.

*Example II*

A Nichrome (80% nickel-20% chromium) wire, about .016" in diameter was drawn through an aqueous slurry of colloidized catalytic alumina and beryllia containing dissolved aluminum nitrate prepared in the same way as in Example I at a rate of about ten feet per minute and then immediately wound on a rectangular frame in closely spaced (.016" apart) parallel strands. After such coating and winding the wet film was dried and the aluminum nitrate contained therein decomposed by heating to incipient red heat by passing an electric current through the wire. The resultant film had a thickness of from about .0002" to .0004" and was uniform and firmly adherent to the surface of the wire. Upon impregnation of this film with about .5% to 1% by weight (based on the weight of the oxide film) of platinum by immersion in an aqueous 1% chloroplatinic acid solution, the resultant catalyst showed excellent activity in catalytically oxidizing trace combustible constituents in gas streams.

Catalysts such as those described above, consisting of electric resistance elements coated with a film of a catalytic oxide of the character described which is impregnated with a small percentage of platinum having numerous advantages over known catalysts of the same general type such as wires composed of or coated with metallic platinum. Catalysts constructed in accordance with the invention require only a fraction of the previous metal required by these prior catalysts and yet are fully as active or more active and less subject to poisoning. A Nichrome wire .016" in diameter for example coated with film of .0005" thickness consisting of a mixture of catalytically active beryllia and alumina impregnated with about 1% by weight of platinum (based on the weight of the oxide film) requires about 0.00007 grams of platinum per linear foot of wire and yet has an activity for catalytically oxidizing gases such as propane equivalent to or greater than a wire of the same diameter composed entirely of metallic platinum.

This application is a continuation-in-part of copending application Serial No. 365,858 filed July 3, 1953 by Eugene J. Houdry and Wilfred M. Adey for Catalytic Structure and Apparatus, now abandoned.

It is understood, of course, that there are many other applications of the invention than those listed above for the purpose of illustration. It is not intended that the invention be limited to the specific examples described, nor in any way, except by the scope of the appended claims.

We claim:

1. A catalytic structure comprising an electric resistance element provided with a thin, adherent, superficial film of catalytic material, said film having a thickness of from .0001" to .006" and being comprised of a difficultly reducible inorganic oxide in a catalytically active form resulting from the dehydration of a hydrated form of the oxide under controlled conditions to produce a dehydrated structure of large internal pore volume and surface area, said oxide being of a type which is difficultly reducible and which may be prepared in the form of a gelatinous hydrated oxide that may be dehydrated under controlled conditions to form dehydrated structures of large internal pore volume and surface area, said film of oxide being impregnated with a finely divided catalytically active metal.

2. A catalytic structure comprising an electric resistance element provided with a thin, adherent, superficial film of a catalytic material, said film having a thickness of from .0001" to .006" and being comprised of a difficultly reducible inorganic oxide in a catalytically active form resulting from the dehydration of a hydrated form of the oxide under controlled conditions to produce a dehydrated structure of large internal pore volume and surface area, said oxide being selected from the group consisting of alumina, beryllia, thoria, magnesia, zirconia, and mixtures thereof.

3. A catalytic structure comprising an electric resistance element provided with a thin, adherent, superficial film of catalytic material, said film being comprised of a difficultly reducible inorganic oxide in a catalytically active form resulting from the dehydration of a hydrated form of the oxide under controlled conditions to produce a dehydrated structure of large internal pore volume and surface area, said oxide being selected from the group consisting of alumina, beryllia, thoria, magnesia, zirconia, and mixtures thereof, impregnated with a minor amount by weight, based on the weight of said oxide, of a finely divided catalytically active metal.

4. A catalytic structure comprising an electric resistance element provided with a thin, adherent, superficial film of a catalytic material, said film being comprised of a difficultly reducible inorganic oxide in a catalytically active form resulting from the dehydration of a hydrated form of the oxide under controlled conditions to produce a dehydrated structure of large internal pore volume and surface area, said oxide being selected from the group consisting of alumina, beryllia, thoria, magnesia, zirconia, and mixtures thereof, impregnated with a minor amount by weight, based on the weight of the said oxide, of a finely divided catalytically active metal selected from the group consisting of platinum, ruthenium, palladium, silver, copper, nickel, chromium, cobalt, and mixtures thereof.

5. A catalytic structure comprising an electric resistance element provided with a thin, adherent, superficial film of a catalytic material of dielectric properties, said film having a thickness of from .0001" to .006" and being comprised chiefly of a catalytically active form of an inorganic oxide of a type which is difficultly reducible and which may be prepared in the form of a gelatinous hydrated oxide that may be dehydrated under controlled conditions to form dehydrated structures of large internal pore volume and surface area.

6. A catalytic structure in accordance with claim 5 in which said oxide film has a thickness of from .0003" to .0015".

7. A catalytic structure comprising a metallic electric resistance element provided with a thin, adherent, superficial film of a catalytic material, said film being from .0001" to .006" in thickness and being comprised of a difficultly reducible inorganic oxide in a catalytically active form resulting from the dehydration of a hydrated form of the oxide under controlled conditions to produce a dehydrated structure of large internal pore volume and surface area, said oxide being selected from the group consisting of alumina, beryllia, thoria, magnesia, zirconia and mixtures thereof, and being impregnated with a minor amount by weight, based on the weight of the said oxide, of a finely divided catalyticaly active metal.

8. A catalytic structure in accordance with claim 7 in which said finely divided catalytically active metal impregnating said oxide film is a metal selected from the group consisting of platinum, ruthenium, palladium, silver, copper, nickel, chromium, cobalt and mixtures thereof.

9. A catalytic structure in accordance with claim 8 in which said film has a thickness of from .0003" to .0015".

10. A catalytic device comprising an elongated electric resistance element adapted to be heated by the passage of electric current therethrough and having portions of its length in close proximity to one another, said element being provided with a thin, tightly adherent film of a catalytic material of dielectric properties, whereby said film provides both catalytic and electric insulating properties thus helping to minimize short-circuiting due to contact of said closely adjacent portions during use of said device.

11. A catalytic device comprising an elongated electric resistance element adapted to be heated by the passage of electric current therethrough and having portions of its length in close proximity to one another, said element being provided with a thin, tightly adherent film of a catalytic material of dielectric properties comprising a catalytically active form of an inorganic oxide of a type which is difficultly reducible and which may be prepared in the form of a gelatinous hydrated oxide that may be dehydrated under controlled conditions to form dehydrated structures of large internal pore volume and surface area, said film providing both catalytic and electrical insulating properties thus helping to minimize short-circuiting due to contact of said closely adjacent portions of said resistance element during use of said device.

12. A catalytic structure comprising an elongated electric resistance element adapted to be heated by the passage of electric current therethrough and having portions of its length in close proximity to one another, said element being provided with a thin, tightly adherent superficial film of catalytic material of dielectric properties comprised chiefly of a catalytically active form of an inorganic oxide selected from the group consisting of alumina, beryllia, thoria, magnesia, zirconia and mixtures thereof, said film providing both catalytic and electrical insulating properties thus helping to minimze short-crcuiting due to contact of said closely adjacent portions during use of said device.

13. A catalytic structure comprising an elongated electric resistance element adapted to be heated by the passage of electric current therethrough and having portions of its length in close proximity to one another, said element being provided with a thin, adherent, superficial film of a catalytic material of dielectric properties comprising a catalytically active form of an inorganic oxide selected from the group consisting of alumina, beryllia, thoria, magnesia, zirconia and mixtures thereof, said film of oxide being impregnated with a minor amount by weight of a finely divided catalytically active metal, the concentration of metal in said film being insufficient to materially effect the dielectric properties thereof, whereby said film provides both catalytic and electrical insulating properties thus helping to minimize short-circuiting due to contact of said closely adjacent portions during use of said device.

14. A catalytic device in accordance with claim 13 in which said finely divided catalytically active metal is selected from the group consisting of platinum, ruthenium, palladium, silver, chromium, nickel, copper, cobalt and mixtures thereof.

15. A catalytic device comprising an elongated electric resistance element in the form of a flat, closely wound coil adapted to be heated by the passage of electric current therethrough and being provided with a thin, tightly adherent film of a catalytic material of dielectric properties, whereby said film provides both catalytic and electrical insulating properties thus helping to minimize short-circuiting due to contact of said closely adjacent portions during use of said device.

16. A catalytic device comprising a plurality of coils of electric resistance wire adapted to be heated by the passage of electric current therethrough and each provided with a thin, adherent, superficial film of a catalytic material of dielectric properties, said coils being supported in superimposed relation in a tube transversely of the flow of reactants through said tube, said coils being adapted to be connected to a source of electric current to heat said coils and thereby maintain said catalytic film at reaction temperatures.

References Cited in the file of this patent

UNITED STATES PATENTS

| Number | Name | Date |
|---|---|---|
| 1,640,710 | Miller | Aug. 30, 1927 |
| 1,970,700 | Kendall | Aug. 21, 1934 |
| 2,043,720 | Wagenhals | June 9, 1936 |
| 2,330,664 | Bennett et al. | Sept. 28, 1943 |